(12) United States Patent
Hotta et al.

(10) Patent No.: US 8,363,533 B2
(45) Date of Patent: *Jan. 29, 2013

(54) OPTICAL PICKUP APPARATUS

(75) Inventors: Tohru Hotta, Nagano (JP); Ryoichi Kawasaki, Gunma (JP); Kenji Kan, Saitama (JP); Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,858

(22) Filed: Mar. 9, 2012

(65) Prior Publication Data

US 2012/0170441 A1   Jul. 5, 2012

Related U.S. Application Data

(63) Continuation of application No. 12/040,518, filed on Feb. 29, 2008, now Pat. No. 8,154,978.

(30) Foreign Application Priority Data

Mar. 2, 2007   (JP) .................................. 2007-52769

(51) Int. Cl.
 *G11B 7/00* (2006.01)
 *G02B 1/10* (2006.01)
(52) U.S. Cl. ................................. 369/112.23
(58) Field of Classification Search ............. 369/112.23, 369/112.01; 359/581
 See application file for complete search history.

(56) References Cited

U.S. PATENT DOCUMENTS

| | | | |
|---|---|---|---|
| 2004/0052509 A1 | 3/2004 | Shimada et al. | |
| 2004/0218503 A1* | 11/2004 | Ikenaka | 369/112.05 |
| 2005/0007934 A1 | 1/2005 | Ohta et al. | |
| 2005/0219683 A1 | 10/2005 | Ohta et al. | |
| 2006/0018237 A1 | 1/2006 | Sugi et al. | |

FOREIGN PATENT DOCUMENTS

| | | |
|---|---|---|
| CN | 1741155 B | 4/2010 |
| JP | 2004039161 A | 2/2004 |

OTHER PUBLICATIONS

Office Action dated Aug. 12, 2010, for Chinese Application No. 200810082268.9 (translation) (6 pages).

* cited by examiner

*Primary Examiner* — Hoa T Nguyen
*Assistant Examiner* — Andrew Sasinowski
(74) *Attorney, Agent, or Firm* — Fish & Richardson P.C.

(57) ABSTRACT

An optical pickup apparatus includes an objective lens having a numeric aperture and an incident face. An antireflection coating is formed on the incident face. A collimating lens converts laser light from a laser diode into parallel light, and causes the parallel light to be made incident on the incident face through the antireflection coating. The thickness of the antireflection coating causes a transmittance of laser light that enters the objective lens to be: set at a first predetermined transmittance value, when the numeric aperture is between zero and a first predetermined numeric aperture value; set to correlate linearly with the numeric aperture when the numeric aperture is between the first predetermined numeric aperture value and a second predetermined numeric aperture value; and set at a second predetermined transmittance value, when the numeric aperture is between the second predetermined numeric aperture value and a third predetermined numeric aperture value.

1 Claim, 3 Drawing Sheets

| | NA | 0.3 | 0.4 | 0.5 | 0.6 | 0.7 | 0.8 | 0.85 | SPOT SIZE | IN-PUPIL INTENSITY DISTRIBUTION |
|---|---|---|---|---|---|---|---|---|---|---|
| THEORETICAL EXAMPLE 1 | TRANSMITTANCE | 100 | 100 | 100 | 100 | 100 | 100 | 100 | 0.3934 μm | UNIFORM |
| THEORETICAL EXAMPLE 2 | | 100 | 100 | 100 | 100 | 100 | 100 | 100 | 0.4122 μm | GAUSSIAN |
| EMBODIMENT 1 | | 55 | 70 | 85 | 100 | 100 | 100 | 100 | 0.3998 μm | GAUSSIAN |
| EMBODIMENT 2 | | 55 | 66 | 78 | 89 | 100 | 100 | 100 | 0.3987 μm | GAUSSIAN |
| EMBODIMENT 3 | | 55 | 64 | 73 | 82 | 91 | 100 | 100 | 0.3975 μm | GAUSSIAN |
| EMBODIMENT 4 | | 55 | 63 | 71 | 80 | 88 | 96 | 100 | 0.3993 μm | GAUSSIAN |

FIG. 4

OPTICAL PICKUP APPARATUS

CROSS-REFERENCE TO RELATED APPLICATION

This is a continuation of U.S. patent application Ser. No. 12/040,518 filed on Feb. 29, 2008, which claims the benefit of priority to Japanese Patent Application No. 2007-52769, filed Mar. 2, 2007, the entire contents of which are incorporated herein by reference in their entirety.

BACKGROUND OF THE INVENTION

1. Field of the Invention

The present invention relates to an optical pickup apparatus executing a reading-out operation of a signal recorded in an optical disc or a recording operation of a signal in the optical disc.

2. Description of the Related Art

An optical disc device capable of a reading-out operation and a recording operation of a signal by applying laser light emitted from an optical pickup apparatus to a signal recording layer of the optical disc has been in widespread use. While the optical disc devices using optical discs called CD or DVD are widely available, optical discs in which recording density is improved, that is, those using Blu-ray standard or HD DVD (High Definition Digital Versatile Disc) standard optical discs have recently been developed.

Infrared light with a wavelength of 780 nm is used as the laser light for executing the reading-out operation of a signal recorded in the optical disc of the CD standard, and red light with a wavelength of 650 nm is used as the laser light with which the reading-out operation of a signal recorded of the DVD standard optical disc is executed.

The thickness of a protective layer provided on a top face of the signal recording layer in the CD standard optical disc is 1.2 mm, and the numerical aperture of an objective lens used for the reading-out operation of a signal from this signal recording layer, is specified to be 0.45. The thickness of the protective layer provided on the top face of the signal recording layer in the DVD standard optical disc is 0.6 mm and the numerical aperture of the objective lens used for the reading-out operation of a signal from this signal recording layer is specified to be 0.6.

In contrast to the case of such CD-standard and DVD-standard optical discs, in the Blu-ray standard or HD DVD standard optical discs, a laser light with a short wavelength, for example, a blue-violet light with a wavelength of 405 nm is used as the laser light executing the reading-out operation of a signal recorded therein.

The thickness of the protective layer provided on the top face of the signal recording layer in the Blu-ray standard optical disc is 0.1 mm, and the numerical aperture of the objective lens used for the reading-out operation of a signal from this signal recording layer is specified to be 0.85.

For a reproduction operation of a signal recorded on the signal recording layer provided in the Blu-ray standard optical disc or for recording a signal on such a signal recording layer, a diameter of a laser spot formed by condensing laser light needs to be reduced. In the objective lens used for obtaining the laser spot shape with a small diameter, not only because the numerical aperture (NA) thereof is increased but also because the focal length thereof becomes shorter, a radius of curvature of the objective lens becomes smaller.

In the optical pickup apparatus, a laser diode is used as an element for generating and radiating the laser light, but intensity of the laser light to be emitted from the laser diode is not constant but has properties called Gaussian distribution. The intensity distribution of such a laser light is in an oval shape, which is well-known in the case of the laser diode.

In the optical pickup apparatus using the objective lens with a small radius of curvature, since the oval laser light emitted from the laser diode enters the objective lens, there decreases rim intensity, i.e. the intensity of the laser light passing through the objective lens in a peripheral portion thereof relative to the intensity of the laser light passing through the objective lens in the vicinity of an optical axis thereof. As a result, there is not only a problem that the peripheral portion of the laser spot becomes blurred but also a problem that focusing intensity decreases.

In such problems, a lens with a small radius of curvature and a large numerical aperture such as the objective lens as mentioned above causes an incident angle of the laser light to become larger on the peripheral side, i.e. an area of a large numerical aperture side, and thereby causes reflectance of the laser light to become larger. Such properties result in the decrease of the above-mentioned rim intensity.

A method of forming an antireflection coating on the objective lens is proposed as a method for solving such a problem and obtaining a desired laser spot (See Japanese Patent Laid-Open No. 2004-39161).

In the Japanese Patent Laid-Open No. 2004-39161, there is described an art in which an antireflection coating is provided on an objective lens so as to minimize the reflectance in a predetermined area by the antireflection coating. Even with this art, though the rim intensity can be improved, the optimal characteristics can not be obtained over the entire region of the objective lens.

SUMMARY OF THE INVENTION

An optical pickup apparatus according to an aspect of the present invention, includes: an objective lens having a numeric aperture, and including an incident face; an antireflection coating formed on the incident face of the objective lens, the antireflection coating being a single layer antireflection coating, or a multi-layer antireflection coating comprising a first layer formed on a second layer; and a collimating lens configured to convert laser light emitted from a laser diode into parallel light, cause the parallel light to be made incident on the incident face through the antireflection coating of the objective lens, and be displaced in a direction of an optical path so as to correct spherical aberration generated due to a difference in thickness of a protective layer of an optical disc, wherein, as a result of the thickness of the antireflection coating: a transmittance of laser light that enters the objective lens through the incident face is set at a first predetermined transmittance value, when the numeric aperture of the objective lens is between zero and a first predetermined numeric aperture value; a transmittance of laser light that enters the objective lens through the incident face is set to correlate linearly with the numeric aperture when the numeric aperture of the objective lens is between the first predetermined numeric aperture value and a second predetermined numeric aperture value; and a transmittance of laser light that enters the objective lens through the incident face is set at a second predetermined transmittance value, when the numeric aperture of the objective lens is between the second predetermined numeric aperture value and a third predetermined numeric aperture value, or is equal to the third predetermined numeric aperture value.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4 is a diagram showing a relation between: transmittance corresponding to a numerical aperture to be adjusted by an antireflection coating coated on an objective lens; and a diameter of a laser spot formed on a signal recording layer, i.e. a spot size.

DETAILED DESCRIPTION OF THE INVENTION

Figure 1:
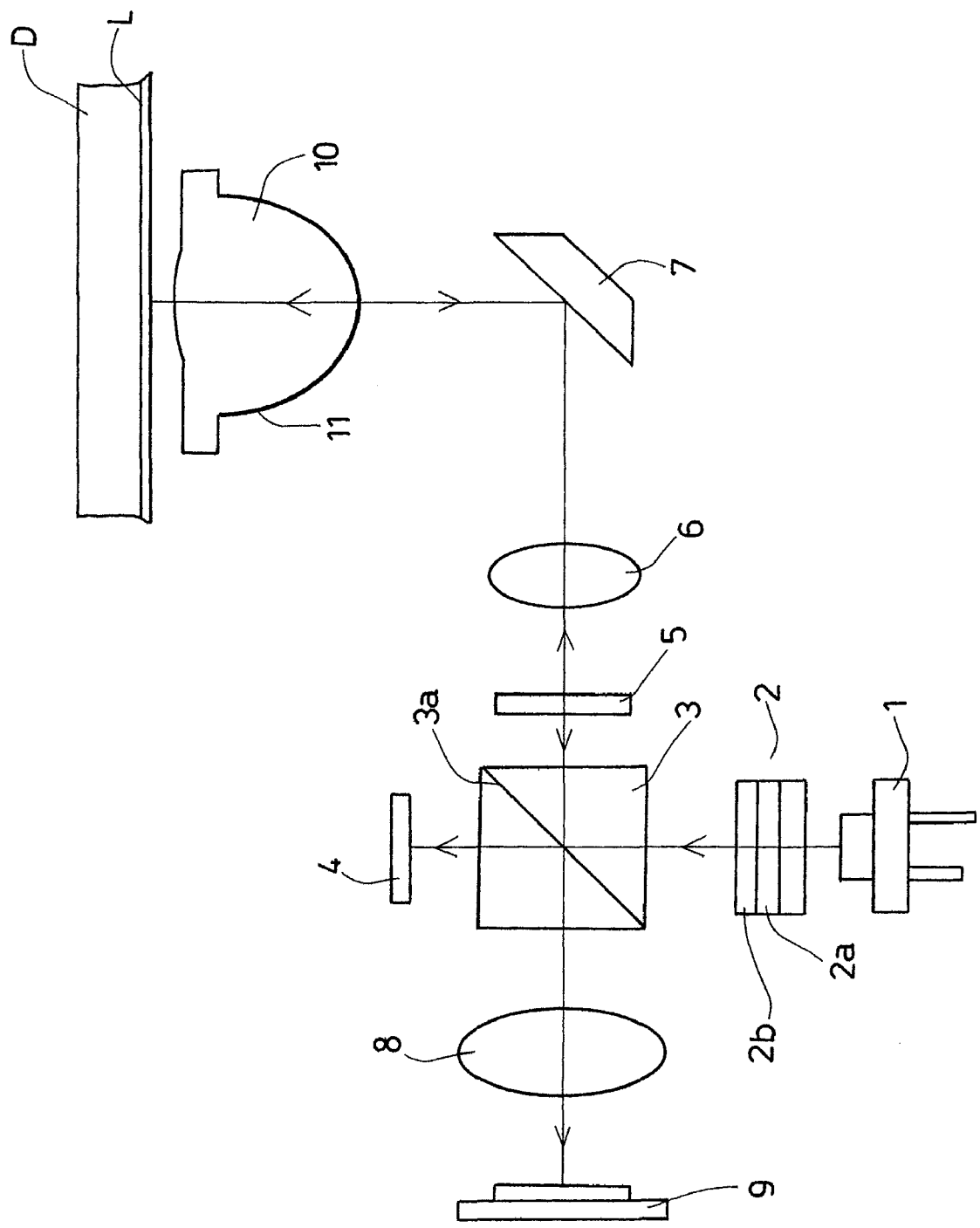
FIG. 1 is a schematic diagram showing an optical pickup apparatus according to an embodiment of the present invention.
Figure 2:
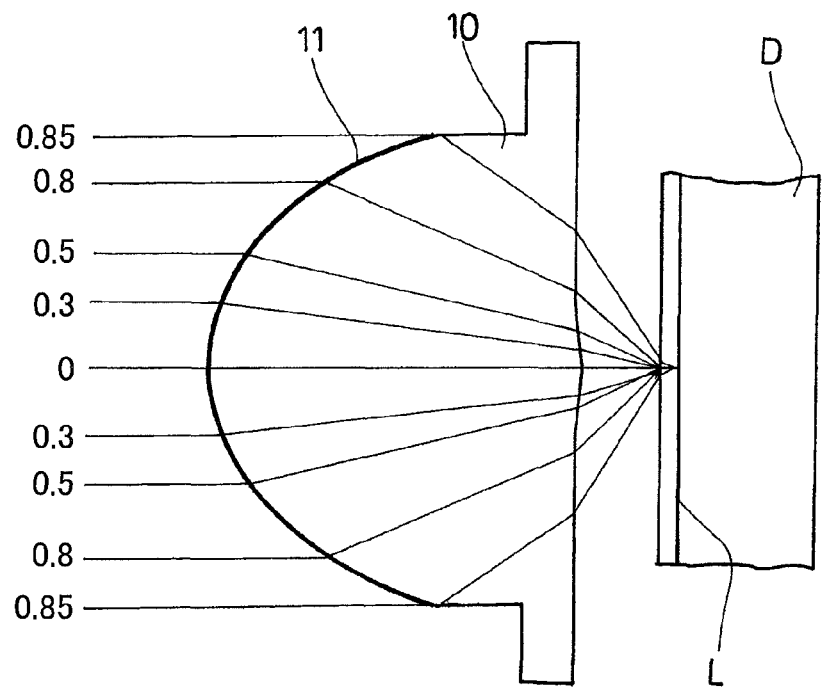
FIG. 2 is an enlarged diagram showing a relation between an objective lens and an optical disc according to an embodiment of the present invention.

At least the following details will become apparent from descriptions of this specification and of the accompanying drawings.

In an embodiment of the present invention, there is provided an objective lens that: focuses laser light, which has properties of Gaussian distribution, emitted from a laser diode, onto a signal recording layer provided in an optical disc; and is set at a first numerical aperture A (maximum numerical aperture), an antireflection coating (coating for adjustment) for adjusting intensity of the laser light passing through the objective lens is provided on a surface of the objective lens: and when transmittance corresponding to the numerical aperture between a second numerical aperture B (where B is a positive number smaller than A) of the objective lens and the first numerical aperture A thereof is set to 100% by the antireflection coating; since there is set the transmittance corresponding to the numerical aperture equal to or smaller than a third numerical aperture C (where C is a positive number smaller than B) to equal to or less than R % (where, R is a positive number smaller than 100); there is prevented decrease of the rim intensity of a laser spot formed by application on the signal recording layer.

Furthermore, in an embodiment of the present invention, the transmittance corresponding to the numerical aperture between the second numerical aperture B and the third numerical aperture C is set so as to be linearly changed. The transmittance indicates a transmittance of the laser light passing through a portion of the objective lens with between the second numerical aperture B and the third numerical aperture C.

Moreover, in an embodiment of the present invention, the antireflection coating is formed with a single layer or multi layers.

As the single-layer antireflection coating, a single-layer coating containing magnesium fluorite may be employed, for example. As the multi-layer antireflection coating, a double-layer coating obtained by laminating a compound coating of titanium dioxide ($TiO_2$) on silicon-oxide coating ($SiO_2$) may be employed. The double-layer coating is easier to adjust transmittance than the single layer. Moreover, since an incident face of the objective lens is substantially spherical, incident angles of the laser light to be incident on a center portion and a peripheral portion of the incident face are different with respect to the incident face. Thus, when the double-layer coating is formed on the surface of the incident face of the objective lens, it is possible to adjust, with more reliability, the transmittance according to a difference in the incident angle of the laser light with respect to the incident face.

Furthermore, in an embodiment of the present invention, the transmittance equal to or less than the third numerical aperture C, i.e. the transmittance from a numerical aperture 0, which is an optical axis center of the objective lens, to the third numerical aperture C is rendered constant.

According to an embodiment of the present invention, an antireflection coating that adjusts the intensity of the laser light passing through the objective lens is provided on the surface of the objective lens set to the first numerical aperture A, and there is prevented the decrease of the rim intensity of a laser spot formed by application on the signal recording layer provided in the optical disc by setting the transmittance corresponding to the numerical aperture equal to or less than the third numerical aperture C (where C is a positive number smaller than B) to equal to or less than R % (where R is a positive number smaller than 100), when the transmittance between the second numerical aperture B of the objective lens (where B is a positive number smaller than A) and the first numerical aperture A is set to 100% by the antireflection coating. Therefore, the laser spot suitable for a signal recording/reproduction operation can be obtained.

Moreover, according to an embodiment of the present invention, since the transmittance corresponding to the numerical aperture between the second numerical aperture B and the third numerical aperture C is set to be linearly changed, a coating operation of the antireflection coating on the objective lens can be easily performed.

Furthermore, according to an embodiment of the present invention, since the antireflection coating is formed with a single layer, a coating operation of the antireflection coating on the objective lens can be easily performed.

Furthermore, according to an embodiment of the present invention, since the antireflection coating is formed with multi layers, a reflection coating with a desired transmittance can be easily provided on the objective lens by using coatings with different reflectance.

Furthermore, according to an embodiment of the present invention, since the transmittance corresponding to the numerical aperture equal to or less than the third numerical aperture C is set to a constant transmittance, the laser light emitted from the laser diode can be used effectively by setting further the transmittance corresponding to the numerical aperture equal to or less than the third numerical aperture C to the required maximum transmittance.

In FIG. 1, reference numeral 1 denotes a laser diode emitting laser light which is blue-violet light with a wavelength of 405 nm, for example, where the laser light to be emitted has the properties of the Gaussian distribution as mentioned above. Reference numeral 2 is a diffraction grating which: the laser light emitted from the laser diode 1 enters; and is made up of a diffraction grating portion 2a for separating the laser light into the 0th order light, +1st order light and −1st order light and a ½ wave plate 2b for converting the incident laser light into a linearly polarized light in an S direction.

Reference numeral 3 denotes a polarization beam splitter which: the laser light having passed through the diffraction grating 2 enters; and provided with a control coating 3a for reflecting S-polarized laser light and having the laser light polarized in a P direction passed therethrough. Reference numeral 4 denotes a monitor photodetector: which is provided in a position to be applied with the laser light having passed through the polarization beam splitter 3 of the laser light emitted from the laser diode 1; and of which the detection output is used for controlling output of the laser light to be emitted from the laser diode 1.

Reference numeral 5 denotes a ¼ wave plate which: is provided in a position where the laser light reflected on the control coating 3a of the polarization beam splitter 3 enters; and converts the incident laser light from linearly polarized light into circularly polarized light. Reference numeral 6 denotes a collimating lens which: the laser light having passed through the ¼ wave plate 5 enters; and is provided for converting the incident laser light into parallel light and for correcting spherical aberration caused by a protective layer of the Blu-ray standard optical disc D.

Reference numeral 7 is a reflecting mirror that: the laser light having been converted into the parallel light in the collimating lens 6 enters; reflects the laser light; and is provided so that return light having been reflected from a signal recording layer L of the optical disc D is applied to, and is reflected in a direction of the polarization beam splitter 3, as will be later.

Reference numeral 8 denotes a sensor lens which: the return light having passed through the control coating 3a provided in the polarization beam splitter 3 enters; and has a cylindrical face, a flat face, a concave curved face, a convex curved face, etc. formed on the side of an incident face and a light-emitting face. Such sensor lens 8 is provided for generating a focus error signal to be used for a focus control operation by generating astigmatism in the return light. Reference numeral 9 denotes a photodetector which: is provided in a position where the return light having passed through the sensor lens 8 is condensed and applied; and is made up of a four-split sensor, etc. in which photodiodes are arranged.

Reference numeral 10 denotes an objective lens which: the laser light having been reflected on the reflecting mirror 7 enters; focuses the incident laser light onto the signal recording layer L provided in the optical disc D; and has a small radius of curvature different from a radius of curvature of a spherical surface. On the surface of the incident face side of the objective lens 10, there is provided an antireflection coating 11 for adjusting the intensity of the laser light passing through the objective lens 10, however, the details of such an antireflection coating will be described later.

When performing the reproduction operation of a signal recorded in the optical disc D, a driving current is supplied to the laser diode 1, and laser light with a wavelength of 405 nm is emitted from the laser diode 1. The laser light emitted from the laser diode 1 enters the diffraction grating 2 where the laser light is separated by the diffraction grating portion 2a making up the diffraction grating 2 into the 0th order light, +1st order light, and −1st order light and is converted by the ½ wave plate 2b into the linearly polarized light in the S direction. The laser light having passed through the diffraction grating 2 enters the polarization beam splitter 3 and is reflected on the control coating 3a provided in the polarization beam splitter 3, while a part of the laser light is passed therethrough and applied to the monitor photodetector 4.

The laser light reflected on the control coating 3a enters the collimating lens 6 through the ¼ wave plate 5, and is converted by a function of the collimating lens 6 into the parallel light. The laser light having been converted by the collimating lens 6 to the parallel light is reflected by the reflecting mirror 7, to be made incident on the objective lens 10. The laser light having been incident on the objective lens 10 is applied to the signal recording layer L of the optical disc D as a spot by a focusing operation of the objective lens 10. The laser light emitted from the laser diode 1 is applied as a desired spot onto the signal recording layer L of the optical disc D as above, and the numerical aperture of the objective lens 10 is set so as to become 0.85 in this case.

When performing the above-mentioned focusing operation of the laser light by the objective lens 10, spherical aberration is generated due to a difference in thickness of the protective layer between the signal recording layer L and the signal incident face of the optical disc D, however, by displacing the collimating lens 6 shown in an embodiment of the present invention in a direction of an optical path, adjustment can be made so that the spherical aberration is minimized.

An applying operation of the laser light onto the signal recording layer L provided in the optical disc D is performed by the above-mentioned operation, and when performing such an applying operation, the return light having been reflected from the signal recording layer L enters the objective lens 10 from the side of the optical disc D. The return light having been incident on the objective lens 10 enters the polarization beam splitter 3 through the reflecting mirror 7, collimating lens 6, and ¼ wave plate 5. Since the return light to be incident on the polarization beam splitter 3 has been converted into the linearly polarized light in the P direction, it passes through the control coating 3a provided in the polarization beam splitter 3.

The return light of the laser light having passed through the control coating 3a enters the sensor lens 8, and astigmatism is caused to occur by a function of the sensor lens 8. The return light in which the astigmatism has been caused to occur by the sensor lens 8 is applied to a sensor portion such as a four-split sensor provided in the photodetector 9 by the light-condensing operation of the sensor lens 8. As a result of the application of the return light to the photodetector 9 as above, a generating operation of a focus error signal is performed with using the change in a spot shape applied to the sensor portion included in the photodetector 9. The focus control operation can be performed by displacing the objective lens 10 in a direction of a signal surface of the optical disc D with using such a focus error signal.

Though not described in an embodiment of the present invention, a configuration is made such that a tracking control operation can be performed with using the +1st order light and the −1st order light generated by the diffraction grating 2, and a reading-out operation of a signal recorded in the optical disc D is executed by performing such a control operation.

The reading-out operation of a signal recorded in the optical disc D is carried out as mentioned above, however, while the reading-out operation is being performed, a part of the laser light is applied to the monitor photodetector 4. Therefore, a driving current value to be supplied to the laser diode 1 can be controlled with using a monitor signal obtained from the monitor photodetector 4.

Since the output of the laser light can be controlled by controlling the driving current value to be supplied to the laser diode 1, not only the reading-out operation of a signal recorded in the optical disc D but also an adjustment operation of the laser output to be required when recording a signal in an optical disc D1 can be performed.

There is performed the reproduction operation of a signal, etc. in the optical pickup apparatus with configuration as shown in FIG. 1 as mentioned above, and the antireflection coating 11 in an embodiment of the present invention will be described.

The antireflection coating 11 is formed with a single layer containing magnesium fluoride, for example, on the surface of the incident face side of the objective lens 10, and the antireflection coating 11 is made up so as to adjust the intensity of the laser light passing through the objective lens 10 by adjusting and controlling the reflectance of the laser light to be reflected. As a result, the intensity of the laser light passing through the objective lens is made substantially uniform in its entirety.

There is shown in FIG. 4 the relation between: the transmittance corresponding to the numerical aperture to be adjusted by the antireflection coating 11 to be coated on the objective lens 10; and the diameter of the laser spot to be formed on the signal recording layer L, i.e. a spot size.

In FIG. 4, a theoretical example 1 shows a case where in-pupil intensity of the laser light emitted from the laser diode 1 has an ideal distribution, instead of the Gaussian distribution, i.e. a uniform distribution, and the transmittance corresponding to all the numerical apertures on the objective lens 10 is 100%, and in such a case, the spot size is 0.3934 μm. That is, theoretically, a value of this spot size gives a minimum size, which means that it is impossible to obtain a spot of a size superior to that.

Similarly, a theoretical example 2 shows a case where the in-pupil intensity of the laser light emitted from the laser diode 1 has the Gaussian distribution and the transmittance corresponding to all the numerical apertures on the objective lens 10 is 100%, and in such a case, the spot size is 0.4122 μm. In the case where the in-pupil intensity of the laser light emitted from the laser diode 1 has the Gaussian distribution as above, if the transmittance corresponding to all the numerical apertures on the objective lens 10 is 100%, influence of the Gaussian distribution causes an increase in spot size.

Embodiments 1 to 4 show cases in each of which: the in-pupil intensity of the laser light emitted from the laser diode 1 has the Gaussian distribution; and the transmittances are made different corresponding to the numerical apertures by the antireflection coating 11 formed on the surface of the objective lens 10.

In the Embodiment 1, the transmittance corresponding to the numerical aperture from 0 (fourth numerical aperture), i.e. a center of the optical axis of the objective lens 10, to 0.3, is set to 55%; the transmittance corresponding to the numerical aperture from 0.6 to the maximum value that is 0.85, is set to 100%; and the transmittance corresponding to the numerical aperture from 0.3 to 0.6 is set so as to be linearly changed. The spot size in such a case is 0.3998 μm.

Next, in the Embodiment 2, the transmittance corresponding to the numerical aperture from 0 to 0.3 is set to 55%; the transmittance corresponding to the numerical aperture from 0.7 to the maximum value that is 0.85, is set to 100%; and the transmittance corresponding to the numerical aperture from 0.3 to 0.7 is set so as to be linearly changed. The spot size in such a case is 0.3987 μm.

Moreover, in the Embodiment 3, the transmittance corresponding to the numerical aperture from 0 to 0.3 is set to 55%; the transmittance corresponding to the numerical aperture from 0.8 to the maximum value that is 0.85, is set to 100%; and the transmittance corresponding to the numerical aperture from 0.3 to 0.8 is set so as to be linearly changed. The spot size in such a case is 0.3975 μm.

In the Embodiment 4, the transmittance corresponding to the numerical aperture from 0 to 0.3 is set to 55%; the transmittance corresponding to the maximum numerical aperture that is 0.85, is set to 100%; and the transmittance corresponding to the numerical aperture from 0.3 to 0.85 is set so as to be linearly changed. The spot size in such a case is 0.3993 μm.

As mentioned above, the spot size in the Embodiment 3 is the smallest, and there can be obtained the spot of a size close to the theoretical example 1. As compared with the case where the transmittance corresponding to the numerical aperture 0.3 is set to 55%; the transmittance corresponding to the maximum numerical aperture that is 0.85, is set to 100%; and the transmittance therebetween is set so as to be linearly changed as shown in Embodiment 4, in the case where the transmittance corresponding to the numerical aperture from 0.8 that is smaller than 0.85, to the maximum value 0.85 is set to 100% as in the Embodiment 3, a spot of a favorable size can be formed.

Figure 3:
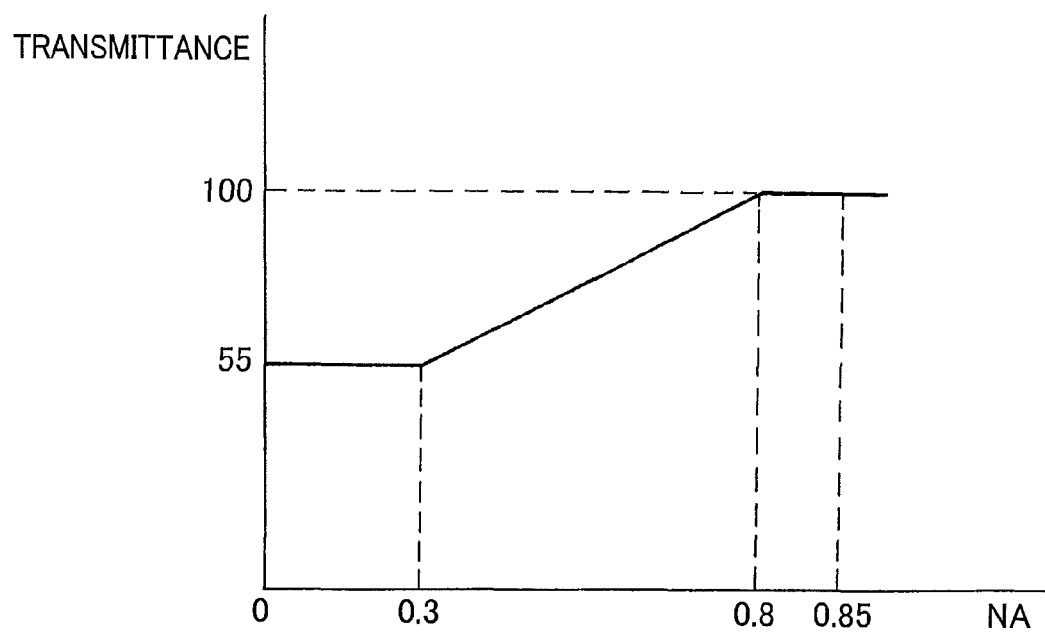
FIG. 3 is a characteristic chart showing a relation between the numerical aperture and transmittance in an objective lens according to an embodiment of the present invention.

FIG. 3 is a characteristic chart showing a relation between a numerical aperture and transmittance in the case of the Embodiment 3, where if the transmittance corresponding to the numerical aperture from 0.8 to 0.85 is set to 100%, the transmittance corresponding to the numerical aperture from 0 to 0.3 is set to 55% (R %) and the transmittance corresponding to the numerical aperture from 0.3 to 0.8 is set so as to be linearly changed.

In the case where the maximum numerical aperture of the objective lens is the first numerical aperture A as in the Embodiments described above, when the transmittance corresponding to the numerical aperture between the second numerical aperture B (where, B is a positive number smaller than A) and the first numerical aperture A is set to 100%, since the transmittance corresponding to the numerical aperture equal to or less than the third numerical aperture C (where, C is a positive number smaller than B) is set equal to or less than R %, there can be generated a laser spot suitable for the reading-out operation and recording operation of a signal recorded in the signal recording layer L of the optical disc D, i.e. a laser spot with sufficiently high rim intensity.

It is possible to change the transmittance continuously between the third numerical aperture C and the numerical aperture 0 on condition that the transmittance should be equal to or less than R %, however, the transmittance is set at a constant value of 55% in embodiments of the present invention, which indicates that the setting is made at the maximum transmittance so as not to adversely affect the rim intensity. That is, the setting is made at a transmittance at which the rim intensity is higher than a predetermined value. In such a fashion, output of the laser light emitted from the laser diode 1 can be utilized at the maximum.

The antireflection coating 11 to be formed on the surface of the objective lens 10 is made up of a single layer, however, a method of an adjustment of reflectance, that is, a method of an adjustment of the transmittance of the laser light of the objective lens 10 can be carried out by changing thickness of the coating at each numerical aperture or material thereof.

And the method can also be carried out by using the antireflection coating 11 made up of multi layers, i.e. multi coating, instead of a single layer.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
an objective lens having a numeric aperture, and including an incident face;
an antireflection coating formed on the incident face of the objective lens, the antireflection coating being a single layer antireflection coating, or a multi-layer antireflection coating comprising a first layer formed on a second layer; and
a collimating lens configured to convert laser light emitted from a laser diode into parallel light, cause the parallel light to be made incident on the incident face through the antireflection coating of the objective lens, and be displaced in a direction of an optical path so as to correct spherical aberration generated due to a difference in thickness of a protective layer of an optical disc, wherein, as a result of the thickness of the antireflection coating:

a transmittance of laser light that enters the objective lens through the incident face is set at a first predetermined transmittance value, when the numeric aperture of the objective lens is between zero and a first predetermined numeric aperture value;

a transmittance of laser light that enters the objective lens through the incident face is set to correlate linearly with the numeric aperture when the numeric aperture of the objective lens is between the first predetermined numeric aperture value and a second predetermined numeric aperture value; and a transmittance of laser light that enters the objective lens through the incident face is set at a second predetermined transmittance value, when the numeric aperture of the objective lens is between the second predetermined numeric aperture value and a third predetermined numeric aperture value, or is equal to the third predetermined numeric aperture value.

* * * * *